United States Patent
Sawalski et al.

(10) Patent No.: US 10,962,219 B2
(45) Date of Patent: Mar. 30, 2021

(54) REPELLANT STRING LIGHT

(71) Applicant: Lamplight Farms Incorporated, Menomonee Falls, WI (US)

(72) Inventors: Michael Sawalski, Racine, WI (US); Jessica Lindquist, Hartland, WI (US); Jason Tilk, Cleveland, OH (US); Jim Szpak, Cleveland, OH (US); Michael Bilinski, Cleveland, OH (US); Gary Stephan, Cleveland, OH (US)

(73) Assignee: LAMPLIGHT FARMS INCORPORATED, Menomonee Falls, WI (US)

( * ) Notice: Subject to any disclaimer, the term of this patent is extended or adjusted under 35 U.S.C. 154(b) by 0 days.

(21) Appl. No.: 16/532,128

(22) Filed: Aug. 5, 2019

(65) Prior Publication Data

US 2020/0041118 A1    Feb. 6, 2020

Related U.S. Application Data

(60) Provisional application No. 62/714,347, filed on Aug. 3, 2018.

(51) Int. Cl.
*F21V 33/00* (2006.01)
*F21V 23/00* (2015.01)
*A01N 25/18* (2006.01)
*F21S 4/10* (2016.01)
*F21Y 115/10* (2016.01)

(52) U.S. Cl.
CPC .......... *F21V 33/0092* (2013.01); *A01N 25/18* (2013.01); *F21S 4/10* (2016.01); *F21V 23/001* (2013.01); *F21Y 2115/10* (2016.08)

(58) Field of Classification Search
CPC ...... F21V 33/0092; F21V 23/001; F21S 4/10; A01N 25/18
USPC .......................................................... 362/96
See application file for complete search history.

(56) References Cited

U.S. PATENT DOCUMENTS

| 2,468,164 | A | | 4/1949 | Brewster |
| 4,647,433 | A | | 3/1987 | Spector |
| 5,513,081 | A | * | 4/1996 | Byers ...................... F21S 2/005 206/419 |
| 5,700,430 | A | | 12/1997 | Bonnema et al. |

(Continued)

FOREIGN PATENT DOCUMENTS

| CN | 101418926 B | 6/2010 |
| CN | 101526206 B | 7/2010 |

(Continued)

OTHER PUBLICATIONS

Griffin M. Dill, IPM, "Cooperative Extension: Insect Pests, Ticks and Plant Diseases", "Pest Management Fact Sheet", 00/00/2011, vol. 5108, Publisher: The University of Maine; https://extension.umaine.edu/ipm/ipddl/publications/5108e/.

(Continued)

*Primary Examiner* — Bryon T Gyllstrom
(74) *Attorney, Agent, or Firm* — David G. Woodral; GableGotwals (57) ABSTRACT

At least one light socket is electrically connected to a power cord and at least one heated repellant dispersal unit is electrically connected to the power cord and increases an evaporation rate of a repellant drawn by a wick from a fluid pod affixed to the heated repellant dispersal unit.

19 Claims, 5 Drawing Sheets

(56) References Cited

U.S. PATENT DOCUMENTS

| | | | |
|---|---|---|---|
| 5,967,644 A * | 10/1999 | Pan | F21S 4/10 |
| | | | 362/249.14 |
| 6,033,212 A | 3/2000 | Bonnema et al. | |
| 6,044,202 A | 3/2000 | Junkel | |
| 6,109,765 A * | 8/2000 | Blanton | F21V 21/088 |
| | | | 248/229.26 |
| 6,935,762 B2 | 8/2005 | Van Dyn Hoven | |
| 7,318,659 B2 * | 1/2008 | Demarest | H05B 47/10 |
| | | | 362/253 |
| 7,503,675 B2 | 3/2009 | Demarest et al. | |
| 7,581,851 B2 | 9/2009 | Wang | |
| 7,618,151 B2 | 11/2009 | Abbondanzio et al. | |
| 7,815,328 B2 | 10/2010 | Van Dyn Hoven | |
| 7,641,364 B2 | 11/2010 | Abbondanzio et al. | |
| 7,835,631 B2 | 11/2010 | Wang | |
| 8,480,248 B2 | 7/2013 | Demarest et al. | |
| 8,494,351 B1 | 7/2013 | Hayes | |
| 8,579,453 B1 | 11/2013 | Cohen et al. | |
| 8,616,735 B2 | 12/2013 | Van Dyn Hoven | |
| 8,772,675 B2 | 7/2014 | Juarez | |
| 9,497,958 B2 | 11/2016 | Shapiro et al. | |
| 9,591,843 B2 | 3/2017 | Formico et al. | |
| 9,968,080 B1 | 5/2018 | Van Kleef et al. | |
| 2001/0012495 A1 * | 8/2001 | Furner | A01M 1/2088 |
| | | | 422/126 |
| 2005/0195600 A1 * | 9/2005 | Porchia | H05B 47/10 |
| | | | 362/240 |
| 2006/0219962 A1 * | 10/2006 | Dancs | A01M 1/2077 |
| | | | 250/577 |
| 2006/0221614 A1 | 10/2006 | Van Dyn Hoven | |
| 2007/0109763 A1 * | 5/2007 | Wolf | H05B 47/105 |
| | | | 362/86 |
| 2007/0109782 A1 * | 5/2007 | Wolf | A61L 9/037 |
| | | | 362/253 |
| 2007/0121319 A1 * | 5/2007 | Wolf | H05B 47/155 |
| | | | 362/231 |
| 2007/0133206 A1 * | 6/2007 | Demarest | F21V 33/0004 |
| | | | 362/253 |
| 2008/0112857 A1 * | 5/2008 | McKenzie-Jones | A01M 1/2083 |
| | | | 422/125 |
| 2008/0144325 A1 | 6/2008 | Van Dyn Hoven | |
| 2013/0011422 A1 | 1/2013 | Berinstein et al. | |
| 2014/0092589 A1 | 4/2014 | Van Dyn Hoven | |
| 2014/0268651 A1 * | 9/2014 | Mumma | A61L 9/03 |
| | | | 362/96 |
| 2015/0144712 A1 | 5/2015 | Formico et al. | |
| 2015/0144713 A1 | 5/2015 | Formico et al. | |
| 2015/0217016 A1 | 8/2015 | McKay et al. | |
| 2018/0348108 A1 * | 12/2018 | Khazaai | F01N 3/2066 |

FOREIGN PATENT DOCUMENTS

| | | |
|---|---|---|
| CN | 203384946 U | 1/2014 |
| CN | 203718399 U | 7/2014 |
| CN | 203963798 U | 11/2014 |
| CN | 204592954 U | 8/2015 |
| CN | 204648023 U | 9/2015 |
| CN | 205756835 U | 12/2016 |
| CN | 107883229 A | 4/2018 |
| CN | 207539677 U | 6/2018 |
| IN | 1282MUMNP2009 A | 3/2010 |
| WO | 2006126139 A1 | 11/2006 |
| WO | 200920568 A1 | 2/2009 |
| WO | 201060239 A1 | 6/2010 |

OTHER PUBLICATIONS

"Old unproven ultrasonic repellant emerges in a new form", "Mosquito Repellent Apps: Do Ultrasonic Sound Devices Work?", 2019, Publisher: MosquitoReviews.com.

Chen CD, Azahari AH, Saadiyah I, Lee HL, "Preliminary study on the effectiveness of mosquito repelling lamp, E Da.", "Trop Biomed.", Dec. 24, 2007, pp. 89-91, vol. 24, No. 2, Publisher: PubMed; https://www.ncbi.nlm.nih.gov/pubmed/18209714.

Bentley, Michael T., et al., "Response of Adult Mosquitoes to Light-Emitting Diodes Placed in Resting Boxes And in the Field", "Journal of the American Mosquito Control Association", 2009, p. 285291, vol. 25, No. 3, Publisher: The American Mosquito Control Association, Inc; https://digitalcommons.unl.edu/cgi/viewcontent.cgi?referer=https://www.google.com/&httpsredir=1&article=2002&context=usdaarsfacpub.

Fiona McDonald, "This Is the Type of Light Bulb to Use if You Want to Avoid Attracting Insects", "https://www.sciencealert.com/scientists-have-figured-out-the-type-of-light-bulb-to-use-if-you-want-to-avoid-insects", Feb. 22, 2016, Publisher: Science Alert;https://www.sciencealert.com/scientists-have-figured-out-the-type-of-light-bulb-to-use-if-you-want-to-avoid-insects.

"Enhancement of mosquito trapping efficiency by using pulse width modulated light emitting diodes", Jan. 6, 2017, vol. 7, No. 40074, Publisher: Scientific Reports; https://www.nature.com/articles/srep40074.

Wikipedia, "Electronic pest control", "https://en.wikipedia.org/wiki/Electronic_pest_control", Unknown.

* cited by examiner

REPELLANT STRING LIGHT

CROSS-REFERENCE TO RELATED CASES

This application claims the benefit of U.S. provisional patent application Ser. No. 62/714,347, filed on Aug. 3, 2018, and incorporates such provisional application by reference into this disclosure as if fully set out at this point.

FIELD OF THE INVENTION

This disclosure relates to outdoor devices having multiple uses. In particular, but not by way of limitation, this disclosure relates to devices providing light and dispersal of scents and/or repellants.

BACKGROUND OF THE INVENTION

Outdoor party lights or string lights have become common for lighting or decorative purposes. These may be based upon low wattage lights such as LEDs (light emitting diodes). However, their utility has remained static for some time and they have not generally been put to further uses.

Dispersion of repellants via electrical power, or plug-in devices, can enhance delivery of effective repellants. However, utility may be limited where battery power is required or where location of use has been restricted to locations very near an outlet. Additionally, for maximum effect with a repellant, it should be placed where it has the greatest exposure to the area sought to be protected.

What is needed is a system and method for addressing the above and related concerns.

SUMMARY OF THE INVENTION

The invention of the present disclosure, in one aspect thereof, comprises a system having a power cord, at least one light socket electrically connected to the power cord, and at least one heated repellant dispersal unit electrically connected to the power cord that increases an evaporation rate of a repellant drawn by a wick from a fluid pod affixed to the heated repellant dispersal unit.

The at least one light socket and the at least one heated repellant dispersal unit may be spaced apart from the power cord by a transverse power cord segment. In some embodiments, a first junction of the power cord and the at least one light socket and a second junction of the power cord and the at least one heated repellant dispersal unit are protected by a first and second insulative junction body respectively. The first and second insulative junction bodies may define a hang loop.

In some systems, the repellant comprises a liquid repellant. The fluid pod may be at least translucent and may further comprise a fluid level indicator float inside the fluid pod. The fluid level indicator may comprise a toroidal ring. The fluid level indicator may comprise a plurality of beads.

The invention of the present disclosure, in another aspect thereof, comprises a system having a power cord with a plug for an outlet, a plurality of light receptacles supplying power provided by the power cord to a light bulb fitted to an associated light socket, and a plurality of repellant dispersion port supplying power provided by the power cord to a resistive heating element in proximity to a repellant contained in a fluid pod, the repellant delivered from the bulb for evaporation by the resistive heating element by a wick placed into the repellant in the fluid pod.

In some embodiments, each of the plurality of light receptacles is spaced apart from the power cord by a respective first transverse power cord. Each of the plurality of light receptacles may be spaced apart from the power cord by a respective second transverse power cord. Each of the respective first transverse power cords and each of the respective second transverse power cords may be spaced from one another along the power cord. In some cases, the plurality of light receptacles does not disperse repellants, and in some cases the plurality of repellant dispersion ports does not provide visible light.

At least one of the plurality of repellant dispersion ports may provide a selectively closeable cover on the associated fluid pod. The fluid pod may contain one or more floats visible outside the fluid pod and indicating a level of the repellant contained in the fluid pod.

The invention of the present disclosure, in another aspect thereof, comprises a method including providing a common power cord to a plurality of light sockets containing light bulbs and spaced apart along the power cord, providing a plurality of heated repellant dispersion ports along the power cord interspersed with the plurality of light sockets on the power cord; and applying electrical power from an outlet to the power cord to provide illumination from the plurality of light sockets and dispersal of a repellant from the heated repellant dispersion ports.

The method may include providing a transverse power cord for each of the plurality of light sockets spacing the light sockets apart from the power cord. It may include supplying each of the plurality of heated repellant dispersion ports with a float situated in an associated fluid pod containing a repellant that indicates the amount of repellant remaining in the fluid pod.

DETAILED DESCRIPTION OF THE PREFERRED EMBODIMENTS

Figure 1:
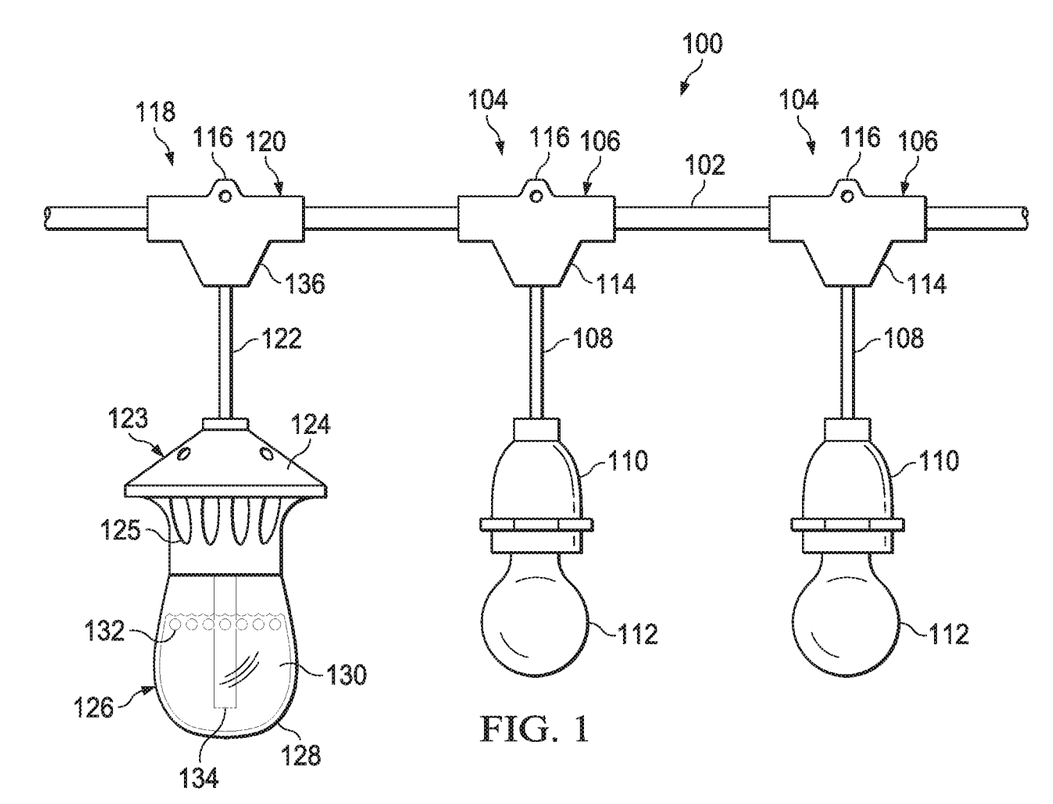
FIG. 1 is a close-up elevational view of a portion of a lighting and dispersal system according to aspects of the present disclosure.

Referring now to FIG. 1, a close-up elevational view of a portion of a lighting and dispersal system 100 according to aspects of the present disclosure is shown. The system 100 is a combination light string and liquid volatilization and dispersal mechanism. Systems of the present disclosure may disperse repellants, scents, oils, chemicals etc., while providing lighting or decorative effects. The system 100 provides a power cord 102 with a plurality of light receptacles 104 spaced along the cord 102. The light receptacles 104 may further each comprise a cord junction 106 with a segment of transverse power cord 108 leading from the junction to a light socket 110. In some embodiments, the light socket 110 is affixed directly to the cord junction 106 (i.e., there is no transverse power cord 108).

The junction 106 provides an internal electrical splice to the power cord 102, which may power a light bulb 112 inserted into the socket 110. The junction 106 may comprise a body 114 that may be constructed of an insulating polymer or another material. The junction 106 may comprise a hang loop 116 defined in or attached to the body 114.

In various embodiments, the light socket 110 may comprise a screw in base such as an E26/E27 base or another base such as E12, E14, E17, E39/E40. In some embodiments, the light socket 110 may comprise a bayonet or press-in style socket. The light bulb 112 may comprise an incandescent light bulb, a compact fluorescent (CFL) bulb, or a light emitting diode (LED) in a form factor to fit the associated socket 110. In one embodiment, the light bulb 112 comprises a 2-watt LED.

In addition to one or a plurality of light receptacles 104, the system 100 comprises one or a plurality of repellant dispersion ports 118. The repellant dispersion ports 118 may each comprise a cord junction 120 connecting a transverse power cord segment 122 to a heating receptacle 123. The cord junction 120 contains body 126 covering an electrical splice from the power cord 102 to supply power to the heating receptacle 123. The body 126 may comprise an insulating polymer. In some embodiments, the heating receptacle 123 is affixed directly to the cord junction 120 (i.e., there is no transverse power cord 122).

The heating receptacle 123 may attach selectively to a repellant assembly 126. The pod 126 may removably inserted into or attach to the receptacle 124 with a threaded connection, a turn and lock connected, a press fit mechanism, a bayonet style connected, a magnetic fitting, or another operable mechanism. The heating receptacle 123 applies heat to the repellant assembly 126 to volatilize and disperse the contents of the pod 126. To that end, ventilation ports 125 may be defined in a body 124 comprising the heating receptacle 123. The body 124 may comprise a polymer or other suitable material.

The pod 126 may comprise a fluid pod 128 that contains a quantity of a pest or insect repellant product 130 such as a synthetic pyrethroid, metofluthrin, meperfluthin, or other product. The fluid pod 128 may also contain scents or other agents. The pod 126 may be provided to the consumer pre-filled and may or may not be serviceable for refilling by the consumer (e.g., the pod 126 may be considered a disposable item). The fluid pod 128 may comprise an opaque or tinted polymer. In some embodiments, the fluid pod 128 may be clear or at least translucent to allow the consumer to ascertain the amount of repellant 130 remaining in the pod 126.

Figure 6:
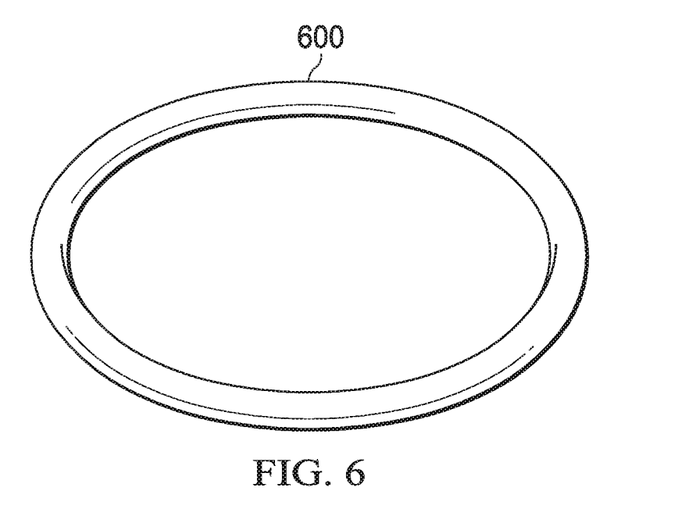
FIG. 6 is a perspective view of a repellant level indicator float ring according to aspects of the present disclosure.

In some cases, various lighting conditions and combinations of the appearance of the repellant 130 and the fluid pod 128 may render determination of the remaining amount of repellant 130 difficult. In some embodiments, a number of floats 132 may be provided in the repellant 130. In the case of small discrete floats 132 or beads, surface tensions of the repellant 130 and the geometry of the meniscus that forms at the top of the repellant layer results in the floats 132 tending to remain near the sides of the repellant bulb 128 such that the fluid level may be easily determined. In other embodiments, a toroidal ring-type float (600, FIG. 6) may be utilized.

Figure 2:
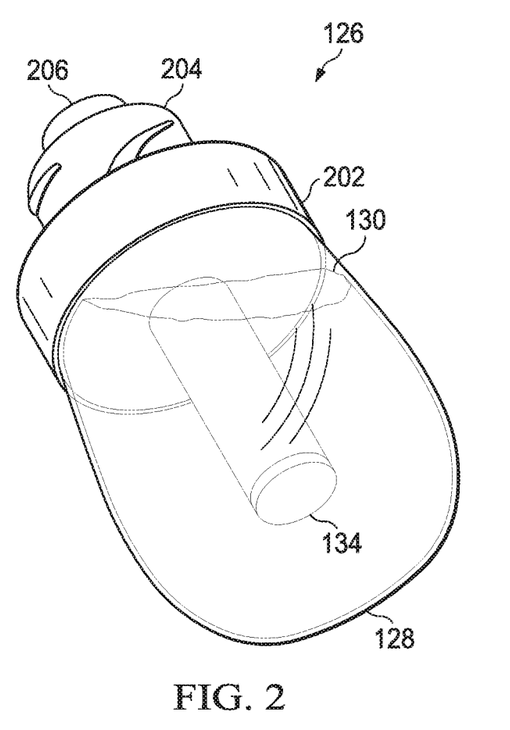
FIG. 2 is a perspective view of a repellant assembly according to aspects of the present disclosure.

Referring now also to FIG. 2 a perspective view of the repellant assembly 126 removed from the heating receptacle 123 is shown. It can be seen that no floats or fluid level indicators are provided in the view of FIG. 2 and that the fluid pod 128 is substantially full as it would appear before use (or after refill). A cap 202 may affix to the top of the fluid pod 128 to prevent spillage of the repellant 130. The cap 202 may provide a fitting 204 for selective attachment into the heating receptacle 123. Here the fitting 204 is illustrated as a threaded fitting. A top port 206 may be provided for passage or evaporation of the repellant 130. In one embodiment, a top of the wick 134 serves as a top port or evaporation pad.

Figure 3:
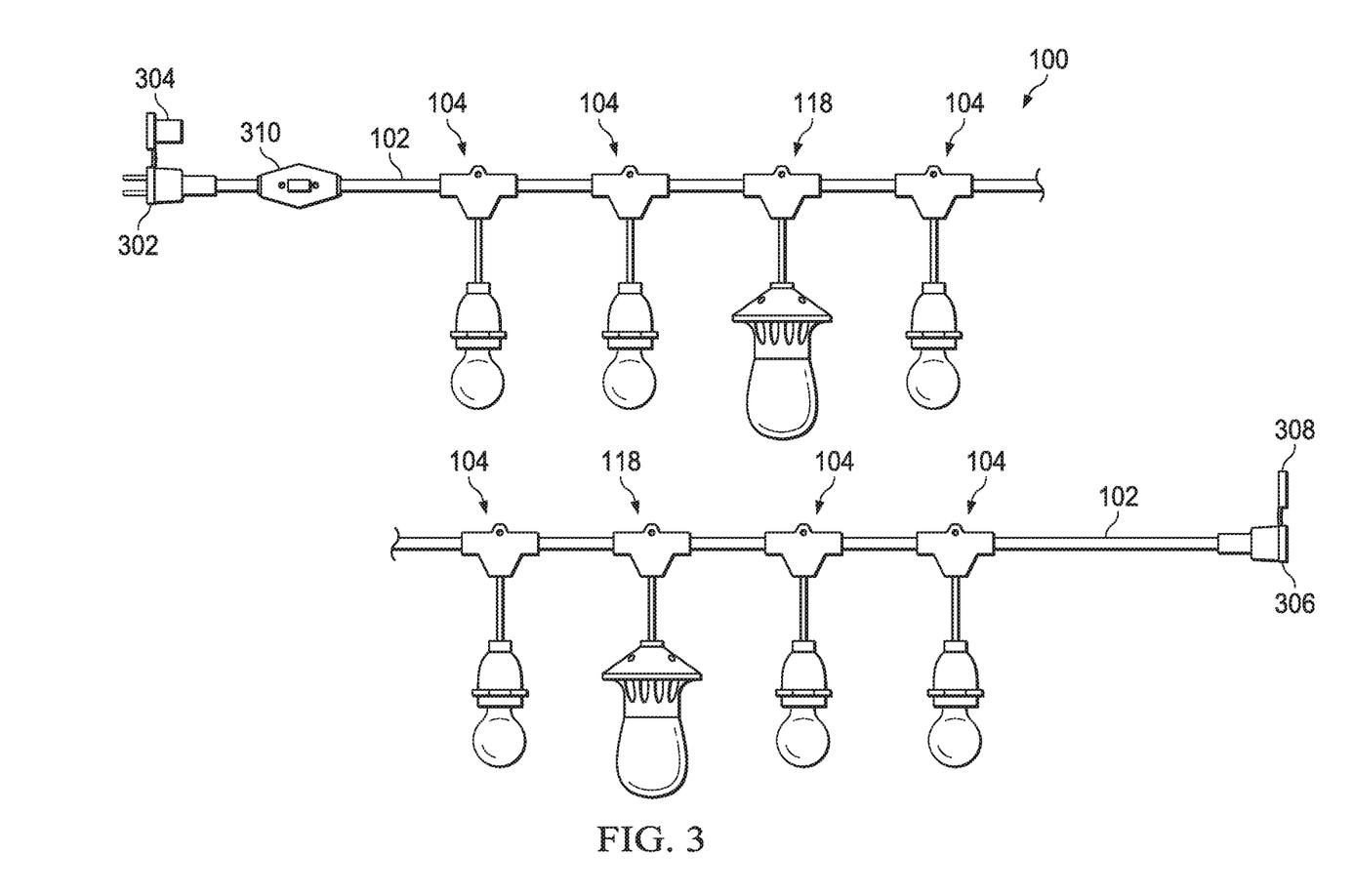
FIG. 3 is an elevational view of a lighting and dispersal system according to aspects of the present disclosure.

Referring now to FIG. 3 an elevational view of the lighting and dispersal system 100 is shown. FIG. 3 is not to scale, nor does it necessarily reflect the total number of light receptacles 104 and repellant dispersion ports 118 associated with the system 100. In some embodiments, there may be equal numbers of each. However, the repellant dispersion ports 118 may provide a wide enough effective repellant area that a relatively greater number of light receptacles 104 may be appropriate.

In one embodiment, power cord 102 may be around 36 feet in length. A total of three repellant dispersion ports 118 are provided along the power cord 102 with a total of twelve light receptacles 104. Various embodiments may be provided with a standard outlet plug 302 (e.g., a standard US/Canada or other type of plug), possibly with an attached cover 304. At an opposite end a standard female outlet 306 may be provided, possibly with an attached cover 308. A power switch 310 may be provided as well. The outlet 306 allows for multiple systems 100 to be chained together, or for the system 100 to provide "downstream" power to other devices.

Figure 4:
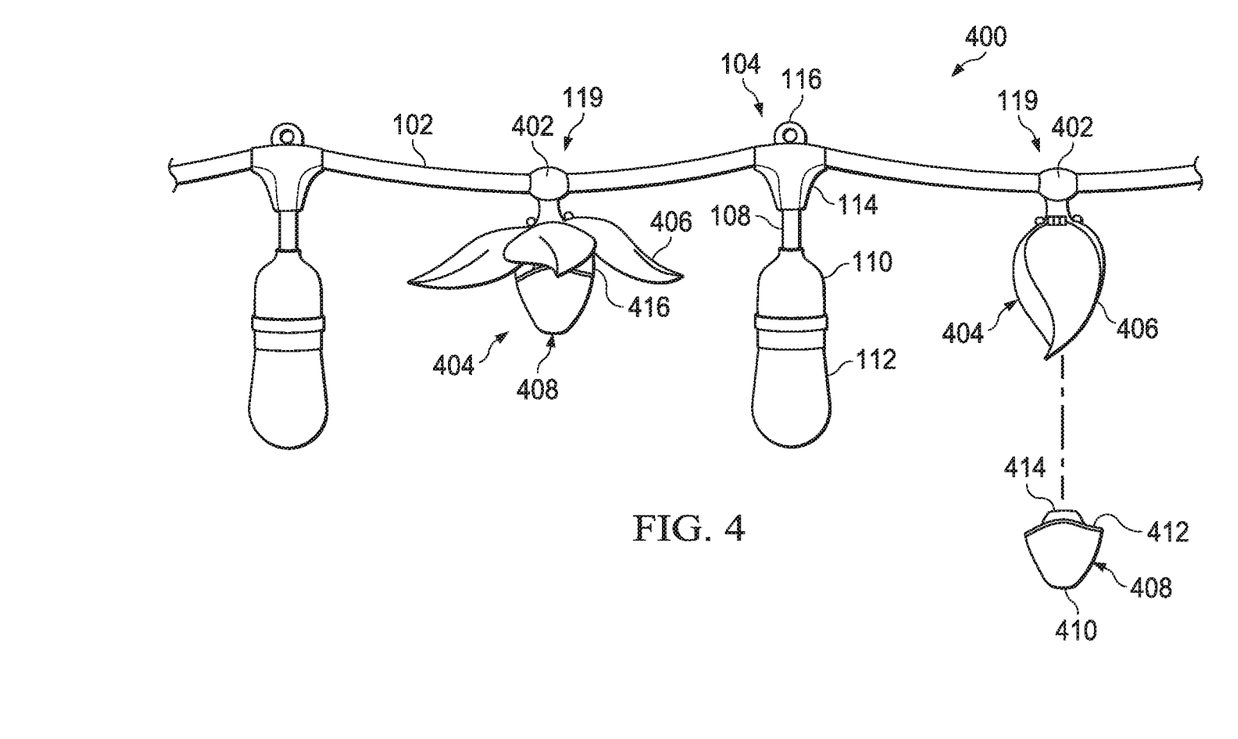
FIG. 4 is a close-up perspective view of another embodiment of a lighting and dispersal system according to aspects of the present disclosure.

Referring now to FIG. 4, a close-up perspective view of another embodiment of a lighting and dispersal system 400 according to aspects of the present disclosure is shown. The system 400 shares many components in common with the system 100 previously described. A power cord 102 provides a common source of power. One or more light receptacles 104 may be provided at various locations along the power cord 102. The power cord may have electrical connections at either end (not shown) as well as a power switch (not shown).

The system 400 comprises one or more repellant dispersion ports 119 that differ in some respects from the repellant dispersion ports 118 discussed previously. The repellant dispersion ports 119 comprise junctions 402 providing an internal power splice and affixing the repellant dispersion port 119 to the power cord 102. Here, the junction 402 also provides a heating element for promotion of evaporation of the associated repellant and other chemicals. A covering 404 selectively surrounds a repellant assembly 408 and heating receptacle 416. In some embodiments, the covering 404 resembles a flower with openable petals 406. The petals 406 may be opened manually to reveal the repellant assembly 408, they may open under a power mechanism, or they may be configured with a low enough mass and loose enough connections to be able to displace under light breezes to reveal the repellant assembly 408.

The repellant assembly 408 may contain any of the aforedescribed repellants or other ingredients, and may be refillable or disposable. As show in the inset, the repellant assembly 408 may include a fluid pod 410 that contains the repellant or other ingredients. The fluid pod 410 may be provided with a cap 412 that may provide a fitting 414 for attachment and detachment from the heating receptacle 416. A wick (not visible) may provide a pathway for movement of the repellant from the fluid pod 410 for dispersion/evaporation by the heating receptacle 416.

Figure 5:
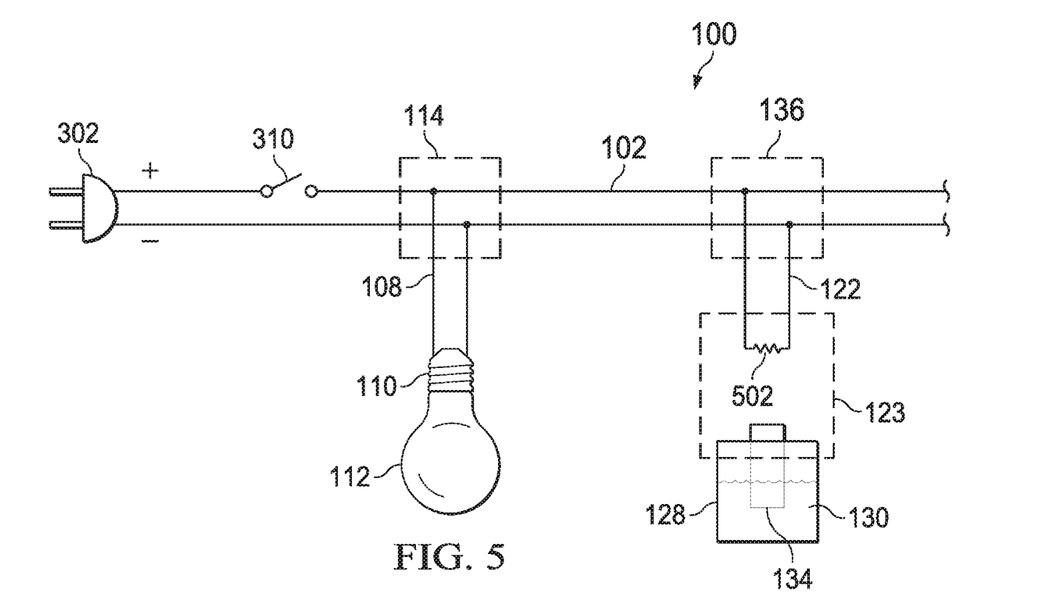
FIG. 5 is a simplified electrical schematic diagram of a lighting and dispersal system according to aspects of the present disclosure.

Referring now to FIG. 5 a simplified electrical schematic diagram of a lighting and dispersal system according to aspects of the present disclosure is shown. FIG. 5 corresponds particularly to the system 100. However, those of skill in the art will appreciate that the schematic is easily adapted to the system 200, or any of the additional embodiments discussed herein. The plug in 302 is shown providing power to the power cord 102, shown as positive and negative leads. Switch 310 controls the positive side of power cord 102. Junction body 114 contains the connecting nodes for transverse power cord 108 to supply current and voltage to light socket 112 and bulb 112.

Junction body 136 contains nodes connecting power cord 102 to transverse power cord 122 leading to the heating receptacle 123. A resistive heating element 502 exposes wick 134 (or at least the repellant) to elevated temperature to gasify or evaporate the same. In some embodiments the wattage of the resistive heating element 502 is less than 8 watts. In another embodiment, the wattage of resistive element 502 is 5 watts or about 5 watts. The temperature provided by the resistive heating element 502 may be from about 120 C to about 140 C.

It should be understood that the arrangement of the components shown in FIG. 5 may be replicated as far as necessary to properly configure each associate lighting receptacle and repellant dispersion port. The system 100 may be configured with the appropriately rated components to operate from about 100V to about 240V. It should also be understood that, in some embodiments, lighting and repellant functions are isolated along the power cord 102. In other words, in some embodiments, the light receptacles 104 are divorced from dispersion of any repellants or other chemicals and are, instead, dedicated to providing only light. Correspondingly, in some embodiments, repellant dispersion ports 118 do not provide any useable light.

In operation, the systems described herein (e.g., system 100 and system 400) may be installed such that they are somewhere above ground level to allow maximum effectiveness of the repellant. In various embodiments 4 feet to 12 feet provides an optimum effect and a repellant zone from mounting level all the way to the ground. The systems may be strung from a roof, fence, wall, tree, dedicated poles, or other structures. The systems 100, 400 are also described as being powered by a household outlet. However, it should be understood they may also be powered by batteries, generators, and other portable power sources.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A system comprising:
   a power cord;
   at least one light socket electrically connected to the power cord; and
   at least one heated repellant dispersal unit electrically connected to the power cord that increases an evaporation rate of a repellant drawn by a wick from a fluid pod affixed to the heated repellant dispersal unit; and
   a fluid level indicator float inside the fluid pod and visible from below the of the pod when the power cord is strung across a space above an area where the repellant is dispersed from the heated repellant dispersal unit;
   wherein a dispersal of the repellant provides a repellant zone from the at least one repellant dispersion unit to a ground level below the at least one repellant dispersion unit.

2. The system of claim 1, wherein the at least one light socket and the at least one heated repellant dispersal unit are spaced apart from the power cord by a transverse power cord segment.

3. The system of claim 2, wherein a first junction of the power cord and the at least one light socket and a second junction of the power cord and the at least one heated repellant dispersal unit are protected by a first and second insulative junction body respectively.

4. The system of claim 3, wherein the first and second insulative junction bodies define a hang loop.

5. The system of claim 1, wherein the repellant comprises liquid repellant.

6. The system of claim 5, wherein the fluid pod is at least translucent.

7. The system of claim 1, wherein the fluid level indicator float comprises a toroidal ring.

8. The system of claim 1, wherein the fluid level indicator float comprises a plurality of beads.

9. A system comprising:
   a power cord having a plug for an outlet;
   a plurality of light receptacles supplying power provided by the power cord to a light bulb fitted to an associated light socket;
   a plurality of repellant dispersion ports supplying power provided by the power cord to a resistive heating element in proximity to a repellant contained in a fluid pod, the repellant delivered from the bulb for evaporation by the resistive heating element by a wick placed into the repellant in the fluid pod;
   wherein each of the plurality of light receptacles is spaced apart from the power cord by a respective first transverse power cord joined to the power cord by a respective junction body in which the power cord and the respective first transverse power cords are electrically interconnected; and
   wherein a dispersal of the repellant provides a repellant zone from each repellant dispersion port to a ground level below the respective repellant dispersion port.

10. The system of claim 9, wherein each of the plurality of light receptacles is spaced apart from the power cord by a respective first transverse power cord.

11. The system of claim 10, wherein each of the plurality of light receptacles is spaced apart from the power cord by a respective second transverse power cord.

12. The system of claim 11, wherein each of the respective first transverse power cords and each of the respective second transverse power cords are spaced from one another along the power cord.

13. The system of claim 9, wherein the plurality of light receptacles does not disperse repellants.

14. The system of claim 9, wherein the plurality of repellant dispersion ports does not provide visible light.

15. The system of claim 9, wherein at least one of the plurality of repellant dispersion port provides a selectively closeable cover on the associated fluid pod.

16. The system of claim 9, wherein the fluid pod contains one or more floats visible outside the fluid pod and indicating a level of the repellant contained in the fluid pod.

17. A method comprising:
    providing a common power cord to a plurality of light sockets containing light bulbs and spaced apart along the power cord;
    providing a plurality of heated repellant dispersion ports along the power cord interspersed with the plurality of light sockets on the power cord;
    stringing the common power cord across an area from four to twelve feet above ground level; and
    applying electrical power from an outlet to the power cord to provide illumination from the plurality of light sockets and dispersal of a repellant from the heated repellant dispersion ports;
    wherein the dispersal of the repellant provides a repellant zone from each repellant dispersion port to the ground level below the respective repellant dispersion port.

18. The method of claim 17, further comprising providing a transverse power cord for each of the plurality of light sockets spacing the light sockets apart from the power cord.

19. The method of claim 17, further comprising supplying each of the plurality of heated repellant dispersion ports with a float situated in an associated fluid pod containing a repellant that indicates the amount of repellant remaining in the fluid pod.

* * * * *